Figure 3:
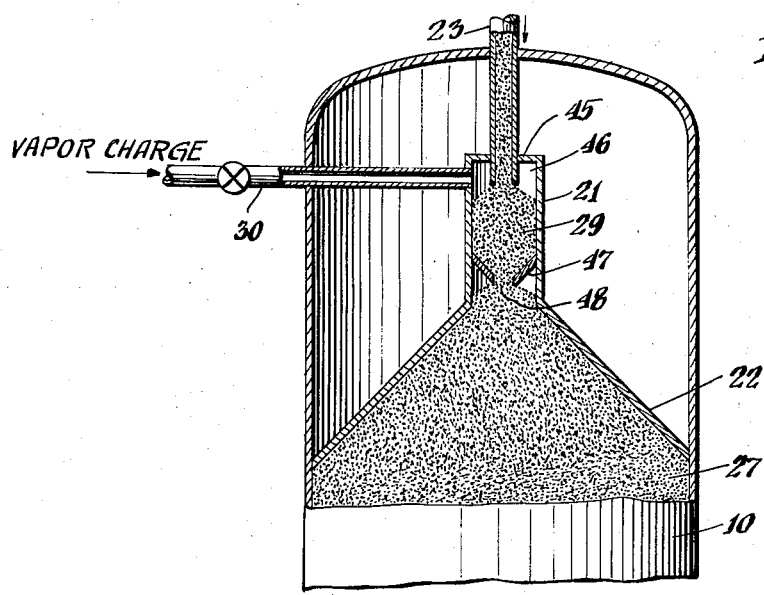

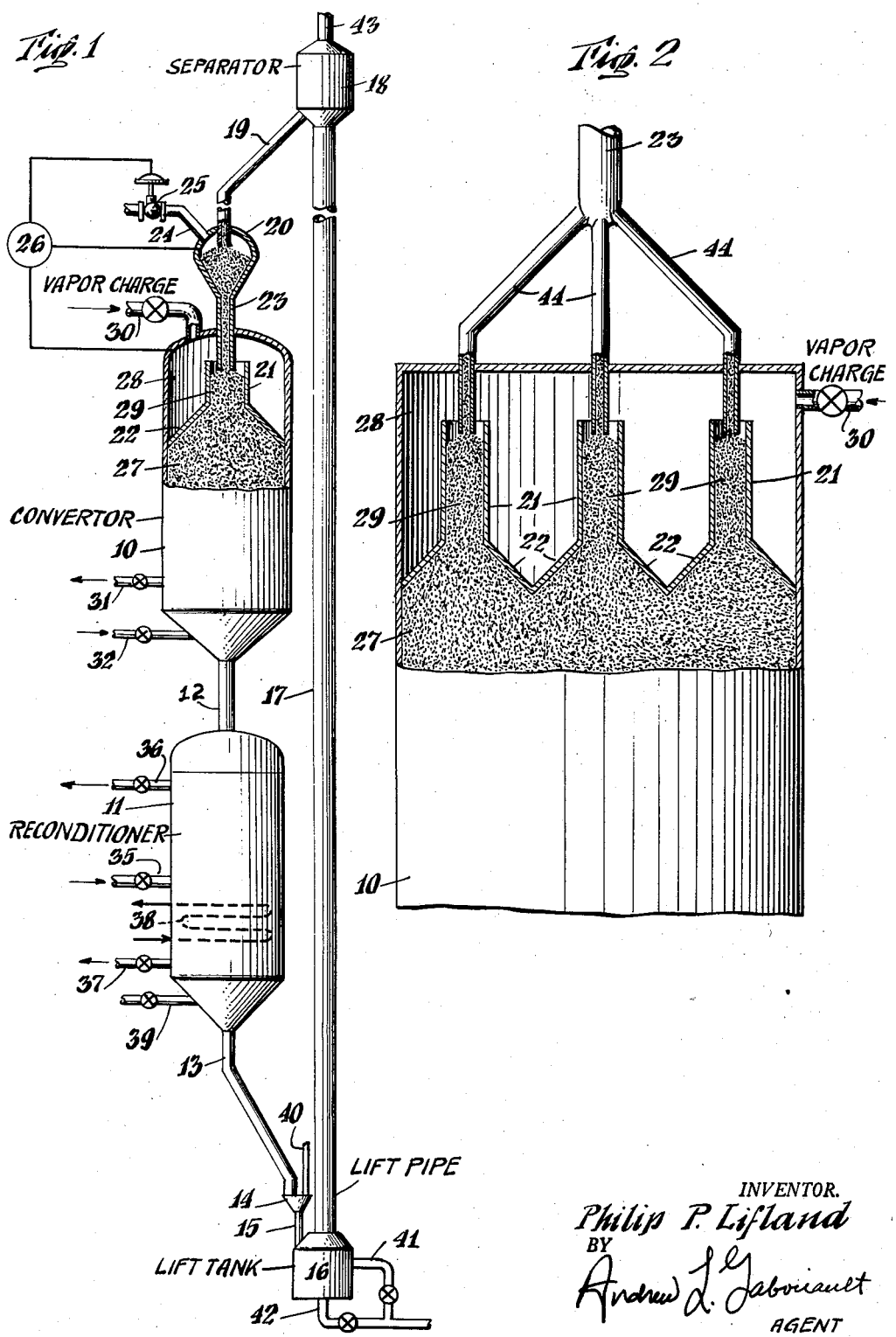

Aug. 5, 1958 — P. P. LIFLAND — 2,846,367
HYDROCARBON CONVERSION PROCESS
Filed Feb. 25, 1953 — 2 Sheets-Sheet 2

INVENTOR.
Philip P. Lifland
BY Andrew L. Jabriault
AGENT

United States Patent Office 2,846,367
Patented Aug. 5, 1958

2,846,367

HYDROCARBON CONVERSION PROCESS

Philip P. Lifland, Woodbury, N. J., assignor to Socony Mobil Oil Company, Inc., a corporation of New York Application February 25, 1953, Serial No. 338,659

7 Claims. (Cl. 196—52)

This invention is concerned with a process for the conversion of gaseous reactants in the presence of a moving mass of granular contact material which may or may not exhibit catalytic properties with respect to the conversion reaction. It is particularly concerned with a process for effecting uniform conversion of the gasous reactant where reactant and contact material are supplied to the moving mass at substantially different temperatures.

Typical of the processes to which this invention applies is the catalytic conversion of a high boiling vaporized hydrocarbon charge to lower boiling products by passing the charge downwardly through a downwardly gravitating, substantially compact bed of granular adsorbent catalytic material at temperatures of the order of 850° F. and upwards. Other exemplary processes include the catalytic reforming, desulfurization, isomerization, and the like, of a vaporized hydrocarbon in the presence of a suitable granular catalyst and the thermal cracking, coking, visbreaking, and the like, of a vaporized hydrocarbon by contact with a heated inert contact material.

Suitable contact material may vary widely in nature, depending on the particular process to which this invention is applied. For example, suitable contact material which is catalytic in nature may partake of the nature of natural or treated clays, bauxite, activated alumina, or synthetic association of silica, alumina or magnesia, or combinations thereof to which certain metallic oxides or sulfides may be added in small amounts for specific purposes. Contact material which is inert in character may partake of the form of refractory materials, such as zirkite, corhart or mullite, or it may partake of the form of stones or metallic particles or balls. In any case, it is desirable to maintain the contact particles within the size range one inch to 30 mesh, and preferably 3 to 14 mesh by Tyler standard screen analysis. The term "granular" is used in describing and claiming the invention to refer to particles of palpable particulate form, like those of the above sizes, as distinguished from finely divided powders, whether of regular shape, such as pellets, tablets, or spheres, or irregular shape, such as obtained from grinding and screening operations.

In processes of the aforementioned types, it is usual to maintain a substantially compact bed of contact material within a confined conversion zone with a gas plenum space above the bed in open communication therewith to which the gaseous reactants are supplied. Used contact material is removed from the lower section of the bed to promote downward movement of the bed while fresh contact material is supplied to the upper surface of the bed at one or more points of restricted area. The gaseous reactant, at a temperature substantially different than the contact material supplied to the bed, passes into the upper end of the bed and downwardly therethrough to effect the desired conversion reaction. Such a system results in cross-flow of contact material and reactant at the upper end of the bed which in turn leads to a temperature gradient across the bed, resulting in uneven conversion of the gaseous reactant. This will be best understood by considering, as an example, a hydrocarbon conversion system operated in the above manner. In such a system it is usually necessary to introduce the vaporized hydrocarbon charge, which may be the total charge or only a portion thereof, to the conversion zone at temperatures substantially below the optimum conversion temperature. This is necessary because the optimum conversion temperature is ordinarily above the temperature at which the vaporized charge undergoes thermal decomposition, and in order to obtain the best quality product such thermal decomposition must be avoided in the vapor charge preheater. Therefore, the heat required to raise the temperature of the vaporized charge from the level to which it can be heated in the preheater without thermal decomposition to the optimum conversion temperature must be supplied by the contact material charged to the conversion zone. In addition, the heat required by the conversion reaction, which is normally endothermic, must be supplied by this contact material. Therefore, contact material supplied to the conversion zone will necessarily be at a temperature substantially above the temperature of the vaporized charge supplied to the conversion zone. This temperature differential may be as much as several hundred degrees. Where the contact material is supplied to the upper surface of the bed as a single central stream of restricted area, as is frequently the case, the upper surface of the bed will assume the shape of a cone with apex at the bottom of the supply stream and sides sloping downwardly and outwardly at angles with the horizontal equal to the angle of repose of the contact material. The angle of repose is normally within the range about 25 to 45 degrees with the horizontal. For most commercially used contact materials it is about 30 degrees. The vaporized charge is supplied to the plenum space above the bed and in open communication therewith and enters the upper end of the bed. Some of the contact material from the supply stream passes directly into the bed in the area directly beneath the supply stream, but a major portion of the contact material passes outwardly across the upper end of the bed as a transversely-flowing layer to supply the portions of the bed not lying directly beneath the supply stream. The upper side of this layer forms the upper surface of the bed and particles from the layer enter the main body of the bed wherein the flow of particles is substantially unidirectionally downward. The cooler vaporized charge entering the bed passes first through this transversely-flowing layer and acts to cool the particles therein. No temperature equilibrium is reached, since the transverse layer flows across the vapor stream. Any given particle in the layer will therefore be cooled an amount, depending on its distance of travel in the layer before entering the main body of the bed. This results in a temperature gradient across the bed, a maximum temperature directly below the supply stream, and a minimum temperature at the outer edges of the bed. This variation in temperature may be as much as several hundred degrees. Substantially, the same effect occurs where contact material is supplied to several sidely spaced-apart restricted areas, except that there will be several points of maximum and minimum temperature. The temperature gradient results in varying degrees of conversion in various laterally spaced-apart regions of the column with probable over-conversion beneath the supply stream and under-conversion in regions beneath the outer edges of the conical pile. It might be thought that the temperature across the column would tend to become uniform shortly below its upper surface due to interchange of contact material across the column between high and low temperature regions. It has been found that the degree of such interchange is slight, so that there is still a marked temperature gradient across the column at its lower end. It would also seem that there should be interchange of vapors across the column between high and low temperature regions which would tend to minimize the uneven conversion in the two sections by subjecting any given unit of charge for a part of its passage through the column to high temperature contact material and for the remainder to lower temperature contact material. It has been found, however, that the expected interchange of vapors through the column does not occur to any great extent. It might further be expected that heat transfer between contact material particles across the bed would tend to equalize the temperature in the lower sections of the bed. The rate of heat transfer between contact material particles is so low, however, that this occurs only to a slight extent.

Where the process is one in which the gaseous reactants are at a higher temperature than the contact material, the situation is reversed. The low temperature point is beneath the contact material supply stream while the high temperature point is near the outer edge of the contact material bed. The undesirable results are obviously the same, however.

An additional reason for the uneven conversion and temperature gradient across the contact material bed in such processes is found in the varying sizes of the contact material particles. While the contact material is normally kept within certain size limits, there is a variation in size within these limits. Also, some finer material is normally formed by attrition during the cyclic process. When the contact material is supplied to the bed as a central stream, the large particles tend to roll over the column surface to the outer portions of the bed and concentrate there while the smaller particles concentrate near the center of the bed. This results in channeling of the gaseous reactant through the bed and, again, uneven reaction.

A major object of this invention is to provide a method and apparatus for the conversion of gaseous reactants which overcomes the above-described difficulties.

Another object of this invention is to provide a method and apparatus for the conversion of vaporized hydrocarbon charge uniformly to gaseous products.

Another object of this invention is to provide a method and apparatus for the conversion of vaporized hydrocarbon charge to lower boiling products in the presence of a downwardly gravitating bed of granular contact material whereby the temperatures across the contact material column at any given level are substantially the same.

These and other objects of the invention will be apparent from the following discussion of the invention.

Before proceeding with this discussion, certain terms used in describing and claiming this invention will be defined. The term "gaseous" is used herein to refer to a material in the gaseous phase under the existing temperature and pressure, regardless of what may be its normal phase under atmospheric conditions. The term "substantially the same" and "substantially equal," when referred to the contact material and gaseous reactant temperatures, are used herein to mean that the temperatures of the two materials are within 100° F. and preferably 60° F. of each other. The term "heat required to effect the conversion reaction" is used herein broadly to include not only the actual heat of reaction but also any heat which may be required to elevate the temperature of the gaseous reactant or vaporized charge to the optimum conversion temperature from the temperature at which it is supplied to the conversion zone.

This invention provides a process for the continuous conversion of gaseous reactants in the presence of a downwardly gravitating, substantially compact bed of granular contact material wherein the upper section of the bed is supplied with contact material by means of at least one downwardly gravitating, substantially compact feed column of contact material. The horizontal cross-sectional area of this feed column is only a minor fraction of the horizontal cross-sectional area of the reaction bed. The lower section of the feed column is gradually expanded to a horizontal cross-sectional area approaching the horizontal cross-sectional area of the bed and contact material delivered therefrom to the bed. The expanding column is laterally confined by means of solid surfaces at angles with the horizontal greater than the angle of repose of the contact material. Gaseous reactant, at a temperature substantially different from the temperature of the contact material in said feed column, is supplied to said feed column at a level substantially above the level at which the expansion of said column begins and this reactant is forced downwardly through the column to effect heat exchange between reactant and column, whereby the temperatures of the two become substantially the same. The reactant is then passed from the column into the reaction bed and downwardly through the bed to effect the desired conversion.

Figure 4:
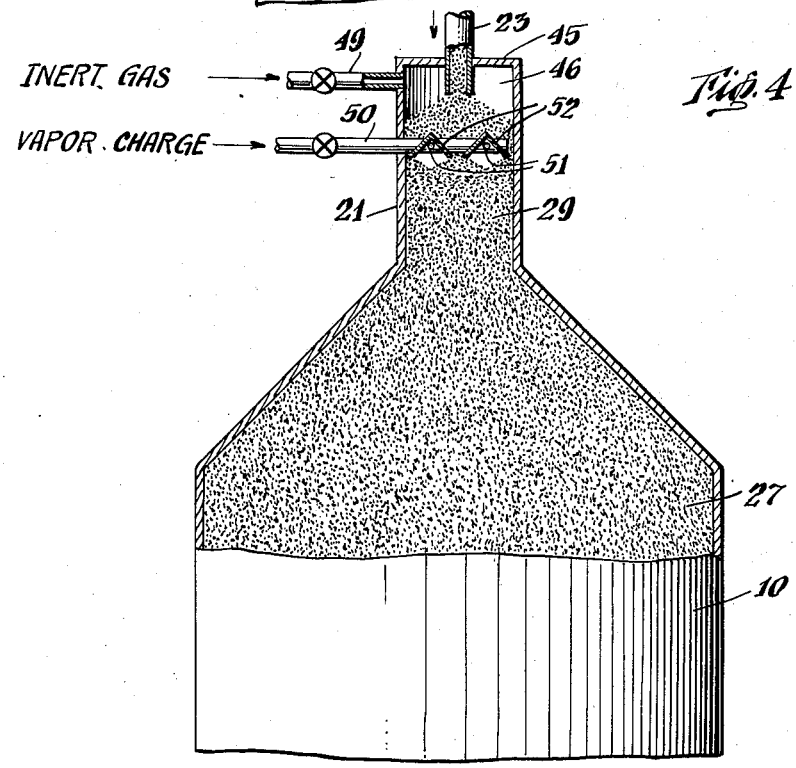

This invention will be best understood by referring to the attached drawings, of which:

Figure 1 is an elevational view, partially in section, illustrating the application of one form of this invention to a hydrocarbon conversion process, and Figures 2, 3 and 4 are elevational views, partially in section, of the upper sections of conversion vessels employing modified forms of this invention.

All of these drawings are diagrammatic in form and like parts in all bear like numerals.

Turning to Figure 1, there is shown therein a conversion vessel or housing 10 positioned above a reconditioning vessel 11. A conduit 12 connects the lower section of housing 10 with the upper section of vessel 11. Extending from lower end of vessel 11 is conduit 13 which connects into a vent chamber 14 and conduit 15 connects chamber 14 with a lift feed tank 16. This lift feed tank may be of any of the suitable constructions well known in the prior art. A lift pipe 17 extends vertically upwardly from an intermediate level in the lift tank 16 to an intermediate level in a separator 18 positioned at a level above conversion vessel 10. Conduit or feed leg 19 connects the lower section of separator 18 with a seal chamber 20 positioned directly above conversion chamber 10. Within the upper section of conversion chamber 10 is a hollow cylinder 21. A hood 22, having downwardly and outwardly sloping sides, extends from the lower end of cylinder 21 outwardly to the walls of vessel 10 at angles with the horizontal greater than the angle of repose of the contact material. Hood 22 and cylinder 21 together take the shape of an inverted funnel. Conduit 23 extends from the lower section of seal chamber 20 into vessel 10 and terminates within the upper section of cylinder 21.

In operation, granular contact material, which may be, for example, a silica-alumina catalyst, at a temperature suitable to supply at least a major portion of the heat required to effect the conversion reaction, for example, about 1030° F., gravitates from a supply accumulation of contact material within the lower section of separator 18 downwardly through feed leg 19 into seal chamber 20. A pressure of inert seal gas, such as steam or flue gas, is maintained within chamber 20 above the gaseous pressure in the upper section of housing 10 by admitting seal gas to chamber 20 through conduit 24 at a rate controlled by diaphragm valve 25 in response to differential pressure controller 26. A downwardly gravitating, substantially compact bed 27 of contact material is maintained within the lower section of housing 10 below hood 22. This bed forms the conversion zone proper of the system. A gas plenum space 28 is provided above bed 27. Contact material gravitates as a compact stream from seal chamber 20 through passages 23 and discharges onto the surface of a substantially compact feed column of contact material 29 at a temperature suitable to supply a major portion of the heat required to effect the desired conversion reaction. Feed column 29 is of horizontal cross-sectional area only a minor fraction of the horizontal cross-sectional area of bed 27. The contact material gravitates downwardly in column 29 and is then expanded outwardly under the solid confining surfaces of hood 22 to a horizontal cross-sectional area approaching the horizontal cross-sectional area of bed 27. Contact material is then delivered from column 29 to bed 27. The solid surfaces of hood 22 maintain bed 27 out of communication with plenum space 28, except through column 29. Looked at in another way, the feed column 29 is supplied to a restricted area of the upper surface of column 27 and the upper surface of 27 is confined from the area of supply by means of the downwardly and outwardly sloping solid surfaces of 22 at angles with the horizontal greater than the angle of repose of the contact material. The confining by the solid surfaces of 22 avoids free surface flow of contact material across the upper surface of bed 27, and thereby minimizes the segregation of the contact material according to particle size. Vaporized hydrocarbon charge, which may be, for example, a petroleum gas oil, is supplied to plenum space 28 through conduit 30 at a temperature substantially below the temperature of the contact material in feed column 29, for example, about 790° F. In a typical operation the gas oil might be charged at a rate of about 15,000 barrels per day, while catalyst is circulated at 315 tons per hour. This charge may be substantially entirely vaporized or it may contain some entrained liquid hydrocarbons. The quantity of entrained liquid should not be such that there is substantial settling out of the liquid in the plenum space. The pressure in plenum space 28 is maintained sufficiently high that vaporized hydrocarbons are forced into the upper end of feed column 29. The vaporized charge passes downwardly through column 29 and heat exchange occurs between the vaporized charge and the contact material in column 29, so that the temperatures of the vaporized charge and contact material become substantially the same or equal at an intermediate temperature before the charge and contact material reach the upper surface of bed 27 and are expanded outwardly under hood 22. The height of column 29 should be sufficient to arrive at this temperature equalization, but since the rate of heat transfer between vapors and contact material is very high, of the order 20,000–100,000 B. t. u. per hour per cubic foot per ° F., the height of column 29 will not be excessive. The vaporized charge is expanded outwardly under the confining surface of hood 22 and then passes downwardly through bed 27 to effect the desired conversion to gaseous products which may contain high percentages of gasoline and fuel oil. These products are removed from the lower section of bed 27 through passage 31. Suitable means may be employed in the lower section of bed 27 to disengage the products from the bed before removal through passage 31, such as those shown in Simpson et al., U. S. Patent No. 2,336,641, or Bergstrom, U. S. Patent No. 2,458,498. The spent contact material is purged free of adhering hydrocarbons in the lower section of bed 27 by inert purge gas, such as steam or flue gas, admitted through conduit 32. The spent contact material is then passed from the lower section of bed 27 into the upper section of reconditioner 11 through conduit 12. The particular reconditioner shown is a catalyst regenerator. The catalytic contact material, bearing a carbonaceous contaminant deposited thereon in the conversion zone, passes through zone 11 as a substantially compact column. A combustion supporting gas, such as air, is admitted centrally to said column through passage 35 and flows upwardly through the upper section of the column and downwardly through its lower section to burn off the contaminant deposit. Flue gas, produced by the burning, is removed through passages 36 and 37. The temperature of the contact material is maintained below the heat damaging level by means of cooling coils 38 through which a suitable cooling fluid is circulated. Other regenerator constructions than that shown may be used. For example, if the contact material is substantially inert in character, reconditioner 11 may take the form of an apparatus the sole function of which is to heat the contact material. The reconditioned contact material is purged by inert gas admitted through passage 39 and gravitated through passage 13 to vent chamber 14 where inert gas is removed through vent 40. Contact material is then passed into lift tank 16 through passage 15. A suitable lift gas, such as air or flue gas, is admitted through conduits 41 and 42, and the contact material is mixed therewith in tank 16 and transported thereby up lift pipe 17 to separator 18 where the lift gas is removed through passage 43 and contact material collects in the lower section of the separator to be returned to housing 10.

By this invention then, cross-flow of gaseous reactant and contact material at different temperatures is avoided. It is true that there will be cross-flow at the upper end of feed column 29 where contact material from passage 23 expands outwardly across the upper surface of column 29. However, because of the restricted area of column 29, this cross-flow is of such a minor nature that it does not create a temperature gradient sufficient to appreciably affect the conversion reaction. Any cross-flow which occurs during the expansion of reactants and contact material under hood 22 occurs after the reactant and contact material have already arrived substantially at an equilibrium temperature and therefore does not give rise to a temperature gradient across bed 27. In addition, particle size segregation, except to the minor extent such segregation occurs at the upper surface of column 29, is minimized by use of confining hood 22.

Figure 2 illustrates a modification of this invention employing a plurality of feed columns rather than a single column. Conversion vessel or housing 10 in this case is rectangular in horizontal cross-sectional shape rather than circular as in Figure 1. The contact material, at a temperature suitable to supply at least a major portion of the heat required to effect the conversion reaction gravitating through passage 23, is split into a plurality of separate compact streams in pasages 44. These streams supply contact material to the upper surface of a plurality of substantially compact feed columns 29 within the upper section of housing 10, one stream supplying each column. Columns 29 are confined within a plurality of uniformly spaced-apart hollow rectangular members 21 and have their upper surfaces in open communication with plenum space 28. Extending from the lower edges of members 21 are hoods 22 of frusto-pyramidal shape. Hoods 22 connect with each other and the walls of housing 10 on their lower ends. A downwardly gravitating, substantially compact bed 27 is maintained below hoods 22 and forms the conversion zone proper. The contact material from feed columns 29 is passed to a plurality of restricted areas on the upper surface of bed 27. The upper surface of the bed is confined from these areas of supply by the downwardly and outwardly sloping solid surfaces of hoods 22 at angles with the horizontal greater than the angle of repose of the contact material, so that bed 27 is maintained out of communication with plenum space 28 except through feed columns 29. Vaporized hydrocarbon charge, at a temperature substantially less than the temperature of the contact material in columns 29, is passed into plenum space 28 through passage 30, then downwardly through columns 29. Heat exchange occurs between the vaporized charge and the contact material in the feed columns 29, whereby the temperatures of the two become substantially the same before they reach the upper surface of bed 27. The process then proceeds as described in connection with Figure 1.

Figure 3 illustrates another apparatus in which a modified form of this invention may be practiced. The apparatus of Figure 3 is identical with that of Figure 1, except that a roof 45 is provided on top of cylinder 21 through which supply conduit 23 extends and a baffle 47, in the shape of an inverted frustum of a cone, is provided in the lower section of cylinder 21. In addition, in the apparatus of Figure 3, the vaporized hydrocarbon charge conduit 30 extends directly into the upper section of cylinder 21, rather than merely into the upper section of housing 10. In Figure 3, pipe 23 extends to a level below the roof 45 of cylinder 21 and delivers contact material to feed column 29. A gas plenum space 46 is defined above the feed column 29. Vapors, at a temperature below the temperature of the contact material in column 29, are supplied to space 46 through passage 30 and are forced downwardly through column 29 to effect substantial equalization of temperature as previously described. A baffle 47, in the shape of an inverted frustum of a cone, with central opening 48, is positioned in the lower section of cylinder 21 and column 29. By means of this baffle, the contact material and vapors from the various laterally spaced-apart regions of column 29 are mixed in passage through opening 48. The baffle further serves to prevent an excess of vapor passing down the outside of the column over that which passes down its center, since it increases the length of the path of flow of the former vapor. The column 29 and vapors then pass onto a restricted area of the upper surface of bed 27 and the process proceeds as previously described.

A further modification of this invention is illustrated in Figure 4. In Figure 4, rather than utilizing a separate hood to confine the upper surface of reaction bed 27, as previously shown, the upper end of the housing 10 has a frusto-conical shape, with sides at an angle greater than the angle of repose of the contact material, and bed 27 fills the housing, the upper end of the housing acting to confine the surface of the bed. Cylinder 21 extends centrally upwardly from the upper end of 10 and is closed off at its upper end by a roof 45. Conduit 23 extends into the upper end of cylinder 21 and discharges contact material at a temperature suitable to supply a major portion of the heat required to effect the conversion reaction onto the upper surface of compact feed column 29 within cylinder 21. Inert seal gas is supplied to the plenum space 46 above column 29 through passage 49. Thus, in this modification a seal chamber exterior to vessel 10 is not required. A vaporized hydrocarbon charge, at a temperature below the temperature of column 29, is passed through conduit 50 into cylinder 21 and then discharged into distributors 52, in the shape of inverted angle-roofed troughs through orifices 51. The charge passes from the distributors into column 29 beneath the upper surface thereof and then downwardly through the column to effect temperature equalization of contact material and charge. The process then proceeds as previously described. By introducing the vaporized charge beneath the surface of column 29, the cross-flow between charge and contact material and charge at the upper end of column 29, which occurred in previous examples of the invention, is avoided. Distributors 52 should be spaced so as to deliver vaporized charge substantially uniformly across the horizontal cross-section of column 29, but should not be so close together that the flow of contact material flow in the column is impaired.

As previously stated, this invention is not limited to hydrocarbon conversion systems but applies to any system wherein a gaseous reactant is converted in the presence of a moving mass of granular contact material where the temperatures of introduction of reactant and contact material are substantially different.

Apparatus in which the process of this invention may be performed may take many different forms than those shown herein as examples. The invention is not limited to systems employing only a gaseous or vaporized charge, but if desired, a liquid charge may be used along with the gaseous charge. This liquid charge could be supplied below hood 22 in bed 27, or to feed leg 21 or to feed column 29. The solid confining surfaces on the upper surface of bed 27, such as the sides of hood 22, should make angles with the horizontal greater than the angle of repose of the contact material. Preferably, these surfaces, and therefore the upper surface of bed 27, should make angles with the horizontal within the range about 40 to 65 degrees. The horizontal cross-sectional area of feed column 29 should be only a minor fraction of the horizontal cross-sectional area of the main body of bed 27. Where a plurality of feed columns are used, the total horizontal cross-sectional area of all of the columns should be only a minor fraction of the horizontal cross-sectional area of the reaction bed. Generally, the ratio of the horizontal cross-sectional area of the reaction bed 27 to the total horizontal cross-sectional area of the feed column or columns should be greater than about 1.0, and preferably greater than about 2.5. There should be a substantial length of feed column between the level of supply of gaseous reactant and the upper surface of the reaction bed or the level where expansion of the contact material from the feed column begins. This length should be such that the temperature of reactant and contact material therein will be substantially the same before delivery to the reaction bed and before any expansion underneath solid confining surfaces, like those of hood 22, begins. Generally, the ratio of the length of column 29, measured from the level of introduction of gaseous reactants, which may be the upper end of the column or some level below its upper surface, to the level where expansion of the contact material from the column begins, to the horizontal cross-sectional area of the column, should be greater than about 0.00004, and preferably greater than about 0.001 where length is expressed in feet and area in square feet.

Because the flow of gaseous reactant through feed column 29 is downward, high velocities of reactant and high pressure drops across the column can be tolerated without interference with the flow of catalyst in the column. The gas velocity may be as high as desired consistent with obtaining temperature equalization of contact material and reactant at the lower end of the column. There is no problem of disengaging this high velocity gas from the column, since it is not disengaged until after its velocity has been decreased due to expansion into the reaction bed 27.

Considering as an example the use of this invention in a hydrocarbon conversion system wherein the contact material supplies at least a major portion of the heat required to effect the conversion reaction, the contact material should be heated before introduction to a temperature sufficient to supply the required amount of heat without falling below the desired optimum temperature for the conversion reaction. Where the contact material is catalytic in nature, the temperature thereof, on introduction should be within the range about 900° F. to 1250° F., while the optimum conversion temperature will usually be within the range about 900° F. to 1100° F. Where the contact material serves merely as a heat carrier, its charging temperature may range as high as 1700° F. The vaporized hydrocarbon charge generally will be introduced at a temperature within the range about 650° F. to 900° F. to avoid excessive thermal conversion in the preheater. The ratio of contact material to total hydrocarbon charge, including the vaporized charge and liquid charge, if used, should generally be within the range about 1 to 20 parts of contact material per part of oil by weight. The space velocity of the total hydrocarbon charge should be within the range 1 to 10 volumes of charge (as 60° F. liquid) per volume of reaction bed per hour.

It is intended to include in this invention all changes

I claim:

1. A continuous process for the conversion of gaseous reactants in the presence of a moving mass of granular contact material, which comprises: maintaining a downwardly gravitating, substantially compact bed of contact material within a confined conversion zone, supplying the upper section of said bed with contact material by means of at least one downwardly gravitating, substantially compact feed column of contact material having a horizontal cross-sectional area only a minor fraction of the horizontal cross-sectional area of said bed, gradually expanding the lower section of said feed column to a horizontal cross-sectional area approaching the horizontal cross-sectional area of said bed and delivering the contact material therefrom to said bed, laterally confining said expanding column by means of solid surfaces at angles with the horizontal greater than the angle of repose of the contact material, supplying a gaseous reactant to said feed column at a level substantially above the level at which expansion of said column begins and at a temperature different from the temperature of contact material in said feed column, passing the gaseous reactant downwardly with said column to effect heat exchange between said reactant and said column, maintaining said column of sufficient height below the level of reactant supply that the temperature of said contact material and said reactant are substantially the same before they issue from said column into said bed, passing gaseous reactant from said feed column downwardly through said bed to effect the desired conversion, removing the products of conversion from said conversion zone and removing contact material from the lower section of said bed.

2. A continuous process for the conversion of a gaseous reactant in the presence of a moving mass of granular contact material, which comprises: maintaining a downwardly gravitating, substantially compact bed of granular contact material within a confined conversion zone, supplying contact material to the upper surface of said bed as at least one confined substantially compact feed column having a horizontal cross-sectional area only a minor fraction of the horizontal cross-section of said bed, confining the upper surface of said bed from the area of supply of contact material by means of downwardly and outwardly sloping solid surfaces at angles with the horizontal greater than the angle of repose of the contact material, supplying gaseous reactant to said feed column at a level substantially above the upper surface of said bed and forcing the gaseous reactant down through said feed column, maintaining said column of sufficient height below the level of reactant supply that the temperature of said contact material and said reactant are substantially the same before they issue from said column into said bed, expanding the gaseous reactant into the bed and passing the gaseous reactant downwardly through the bed to effect the desired conversion, removing the products of conversion from the lower section of the bed separately of contact material and removing contact material from the lower section of the bed.

3. A continuous process for the conversion of a vaporized hydrocarbon charge in the presence of a moving mass of granular contact material, which comprises: maintaining a downwardly gravitating, substantially compact column of granular contact material within a confined conversion zone, supplying contact material at a temperature suitable to supply at least a major portion of the heat required to effect the conversion reaction to a restricted area on the upper surface of said bed as a confined substantially compact feed column having a horizontal cross-sectional area only a minor fraction of the horizontal cross-sectional area of said bed, confining the upper surface of said bed from the area of supply of said contact material at angles with the horizontal greater than the angle of repose of the contact material by means of downwardly and outwardly sloping solid surfaces whereby free flow of contact material across the upper surface of said bed is eliminated, passing a vaporized hydrocarbon charge at a temperature substantially below the temperature of the contact material in said feed column into said feed column at a level above the upper surface of said bed and downwardly through said feed column to effect heat exchange between said vaporized charge and the contact material in said column, maintaining said column of sufficient height below the level of reactant supply that the temperature of said contact material and said reactant are substantially the same before they issue from said column into said bed, expanding the vaporized charge from said column into said bed and passing the vaporized charge into and downwardly through said bed to effect the desired conversion, removing the products of conversion from the lower section of said bed separately of contact material and removing contact material from the lower section of said bed.

4. A continuous process for the conversion of a vaporized hydrocarbon charge to gaseous products in the presence of a moving mass of granular contact material, which comprises: maintaining a downwardly gravitating, substantially compact bed of granular contact material within a confined conversion zone, supplying granular contact material at a temperature suitable to supply at least a major portion of the heat required to effect the conversion reaction into a restricted area of the upper surface of said column as a confined substantially compact feed column of contact material having a horizontal cross-sectional area only a minor fraction of the horizontal cross-sectional area of said bed, confining the uppper surface of said bed from the area of supply of contact material at angles with the horizontal greater than the angle of repose by means of solid surfaces which slope downwardly and outwardly from the restricted area of supply of contact material to the outer edges of the conversion zone whereby free surface flow of contact material across the upper surface of said bed is avoided, passing vaporized hydrocarbon charge at a temperature substantially below the temperature in said feed column into the upper end of said feed column and downwardly through said feed column, maintaining said column of sufficient height below the level of reactant supply that the temperature of said contact material and said reactant are substantially the same before they issue from said column into said bed, supplying contact material at a temperature suitable to supply a major portion of the heat required by the conversion reaction to the upper section of said feed column, baffling the flow of contact material in the lower section of said feed column so as to effect mixing of contact material from the outer regions of said column with contact material in the central regions of said column, expanding vaporized charge from the column into the bed and passing the vaporized charge downwardly through the bed to effect the desired conversion to gaseous products, removing gaseous products from the lower section of said bed and removing contact material from the lower section of said bed.

5. A continuous process for the conversion of a vaporized hydrocarbon charge to gaseous products in the presence of a downwardly gravitating, substantially compact bed of granular contact material, which comprises: maintaining said bed within the lower section of a housing, maintaining a gas plenum space above said bed in the upper section of said housing, supplying contact material to a restricted area on the upper surface of said bed by means of a confined substantially compact feed column of contact material with upper surface within said housing in open communication with said plenum space, said column being of such a horizontal cross-sectional area and height that the ratio of the horizontal cross-sectional area of said bed to the horizontal cross-sectional area of said column is greater than about 1.0, and the ratio of the height of said column to the horizontal cross-sectional area of the column is greater than about 0.00004 where said height is expressed in feet and said column area in square feet, supplying contact material at a temperature suitable to supply at least a major portion of the heat required to effect the desired conversion reaction to the upper section of said feed column, confining the upper surface of said bed by means of solid surfaces sloping downwardly and outwardly from the restricted area of supply of contact material at angles with the horizontal greater than the angle of repose of the contact material whereby said bed is maintained out of communication with said plenum space, except through said column, and free surface flow of contact material across the upper surface of said bed is avoided, supplying a vaporized hydrocarbon charge to said plenum space at a temperature substantially below the temperature of the contact material supplied to said feed column, passing vaporized charge from said plenum space into the upper end of said feed column and downwardly through said feed column whereby heat exchange occurs between said charge and the contact material in the feed column, so that the temperature of the charge and the temperature of the feed column becomes substantially the same before reaching said bed, expanding vaporized charge from said feed column into said bed and passing the charge downwardly through the bed to effect the desired conversion to gaseous products, removing the gaseous products from the lower section of said bed separately of the contact material and removing used contact material from the lower section of said bed.

6. A continuous process for the conversion of a vaporized hydrocarbon charge to gaseous products in the presence of a moving mass of granular contact material, which comprises: maintaining a downwardly gravitating, substantially compact bed of granular contact material within a confined conversion zone, supplying contact material to the upper surface of said bed as a plurality of uniformly spaced-apart substantially compact feed columns, the ratio of the horizontal cross-sectional area of said bed to the total horizontal cross-sectional area of said column being greater than 1.0, and the ratio of height to horizontal cross-sectional area of each feed column being greater than 0.00004 where said height is expressed in feet and said column area in square feet, confining the upper surface of said bed by means of solid surfaces sloping downwardly and outwardly from each of the areas of supply of contact material thereto at angles with the horizontal greater than the angle of repose of the contact material, thereby avoiding free surface flow of contact material across the bed surface, supplying contact material at a temperature suitable to supply at least a major portion of the heat required to effect the conversion reaction to the upper section of each of said feed columns, passing a vaporized hydrocarbon charge at a temperature substantially below the temperature at which contact material is supplied to said feed columns into the upper end of each of said feed columns and downwardly through each of said columns, whereby heat exchange occurs between said vapor charge and the contact material in said columns so that the temperature of the vaporized charge and the temperature of the contact material becomes substantially the same before reaching said column, expanding vaporized charge from said feed columns into said bed and passing the charge downwardly through the bed to effect the desired conversion to gaseous products, removing gaseous products from the lower section of said bed and removing used contact material from the lower section of said bed.

7. A continuous process for the conversion of a vaporized hydrocarbon charge to gaseous products in the presence of a moving mass of granular contact material, which comprises: maintaining a downwardly gravitating, substantially compact bed of granular contact material within a confined conversion zone, supplying contact material to a restricted area of the upper surface as at least one substantially compact feed column of horizontal cross-sectional area such that the ratio of the horizontal cross-sectional area of said bed to the horizontal cross-sectional area of said column is greater than about 2.5, confining the upper surface of said bed from the area of supply of contact material by means of solid surfaces sloping downwardly and outwardly at angles with the horizontal greater than the angle of repose of the contact material, supplying contact material to the upper section of said column at a temperature suitable to supply at least a major portion of the heat required to effect the conversion reaction, supplying a vaporized hydrocarbon charge to said feed column at a temperature substantially below the temperature at which contact material is supplied to said column and at a level below the upper surface thereof and sufficiently above the lower end of said column that the ratio of the length of column below said level of supply of charge to the horizontal cross-sectional area of said column is greater than 0.001 where said height is expressed in feet and said column area in square feet, forcing the vaporized charge downwardly through said column and into said bed whereby heat exchange will occur between said vaporized charge and the contact material in said column so that the charge and contact material arrive at a temperature equilibrium before reaching said bed, expanding the charge into said bed and passing the charge downwardly through the bed to effect the desired conversion to gaseous products, removing said products from the lower section of said bed and removing contact material from the lower section of said bed.

References Cited in the file of this patent

UNITED STATES PATENTS

| | | |
|---|---|---|
| 2,509,019 | Simpson et al. | May 23, 1950 |
| 2,565,811 | Hall | Aug. 28, 1951 |
| 2,661,321 | Schutte | Dec. 1, 1953 |
| 2,739,994 | Bills | Mar. 27, 1956 |